May 25, 1965 J. F. CACHAT 3,185,807

FLUSHING DEVICE FOR PIPE WELDING MILL

Filed July 12, 1962

INVENTOR.
JOHN F. CACHAT
TILBERRY & BODY
BY
ATTORNEYS

United States Patent Office 3,185,807
Patented May 25, 1965

3,185,807
FLUSHING DEVICE FOR PIPE WELDING MILL
John F. Cachat, Cleveland, Ohio, assignor to The Ohio Crankshaft Company, Cleveland, Ohio, a corporation of Ohio
Filed July 12, 1962, Ser. No. 209,389
2 Claims. (Cl. 219—8.5)

The present invention pertains to the art of metal welding and more particularly to an improvement in an apparatus for welding the converging edges of a C-shaped skelp to form a continuous length of welded pipe.

The present invention is particularly applicable to a pipe welding mill, or more generally to an apparatus of the type in which welding current is induced into the converging edges of a C-shaped skelp as these edges are forced together preparatory to welding, and the invention will be discussed with particular reference thereto; however, it is to be appreciated that the invention has much broader applications and may be used in a variety of pipe welding mills such as the type wherein the welding current is directed into the converging edges of the C-shaped skelp by sliding or rolling contact riding along the skelp edges ahead of the point at which the edges converge.

In making metal pipes of indefinite lengths it has become common practice to provide a continuous flow pipe welding mill or apparatus wherein a continuous length of C-shaped skelp is rolled to force the edges of the skelp into convergence while the edges are being heated to welding temperature by inducing or conducting a high frequency current into the edges. The temperature of the heated edges is such that they are fused at a welding point which, for simplicity, is assumed to be the point at which the edges converge; however, it is appreciated that in practice, the welding point of the converging edges is spaced slightly behind the initial point of convergence. Usually, the welding current is passed along the spaced edges of the skelp and across the convergence point so that the edges are pre-heated and later raised to the welding temperature by current flowing across the converging edges.

To control the flow of current along the converging edges of the skelp and across the point of initial convergence, it has become a common expedient to provide a current pattern controlling member constructed from a high magnetic permeability material and positioned within the pipe slightly below the point of convergence. Although a current pattern controlling member of the type explained substantially improved the welding operation, its use introduced certain disadvantages. For instance, for efficient operation, the current pattern controlling member must be closely spaced from the skelp; therefore, during continuous operation of the mill, small particles of metal splattering from the welding point could easily accumulate on the upper surface of the member. After a rather short operating period, determined by the amount of particles splattering from the welding point, the metal particles would build up between the current controlling member and the inner surface of the pipe until a complete metallic bridge was formed between the pipe and the member. This bridge of particles grounded the pipe to the current pattern controlling member, and the welding mill had to be shut down to clean out the metal accumulation. This substantially increased the cost of the welding operation and presented a distinct disadvantage in the use of a current pattern controlling member.

These and other disadvantages have been overcome by the present invention which is directed toward a means for preventing an accumulation of metal particles between the inner surface of a C-shaped skelp being welded into a pipe and a closely spaced current pattern controlling means below the welding point.

In accordance with the present invention there is provided a device for preventing the accumulation of metal particles between a C-shaped skelp being welded into the pipe at a point adjacent the point of convergence of the skelp edges and a member within the pipe, the device comprisng a source of fluid and means for directing the fluid between the pipe and the member to carry away particles dropping from the welding point.

The primary object of the present invention is the provision of a device for preventing the accumulation of metal particles between a C-shaped skelp being welded into a pipe at a welding point and a current pattern controlling member spaced slightly below the welding point.

Another object of the present invention is the provision of a device for preventing the accumulation of metal particles between a C-shaped skelp being welded into a pipe at a welding point and a current pattern controlling member spaced slightly below the welding point, which device is inexpensive to manufacture, easy to install, requires no modification of existing installation and requires negligible power in operation.

Still a further object of the present invention is the provision of a device for preventing the accumulation of metal particles between a C-shaped skelp being welded into a pipe at a welding point and a current pattern controling member spaced slightly below the welding point, which device includes no moving parts.

Still a further object of the present invention is the provision of a device as discussed above, which device needs no maintenance during operation.

Yet another object of the present invention is the provision of a device for preventing the accumulation of metal particles between a C-shaped skelp being welded into a pipe at a welding point and a current pattern controlling member spaced slightly below the welding point, which device directs a fluid, such a water, over the surface of the member to flush from the surface intermittently, or continuously, small particles spattering from the welding point of the pipe.

Another object of the invention is the provision of a device as discussed above which device uses a cooling fluid of the current pattern controling member to flush the particles from the surface of the member.

A further object of the present invention is the provision of a device for preventing the accumulation of metal particles between a C-shaped skelp being welded into a pipe at a welding point and a current pattern controlling member spaced slightly below the welding point, which device comprises a fluid means for flushing from between the pipe and the member metal particles spattering from the welding point.

These and other objects and advantages will become apparent from the following description used to illustrate a preferred embodiment of the invention as read in connection with the accompanying drawing in which.

Figure 1:
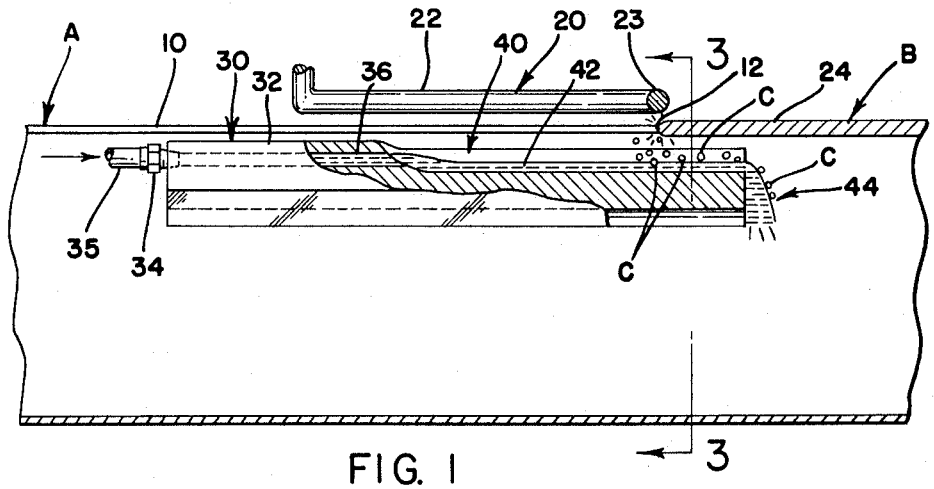
FIG. 1 is a partial cross sectional view illustrating the preferred embodiment of the present invention.
Figure 2:
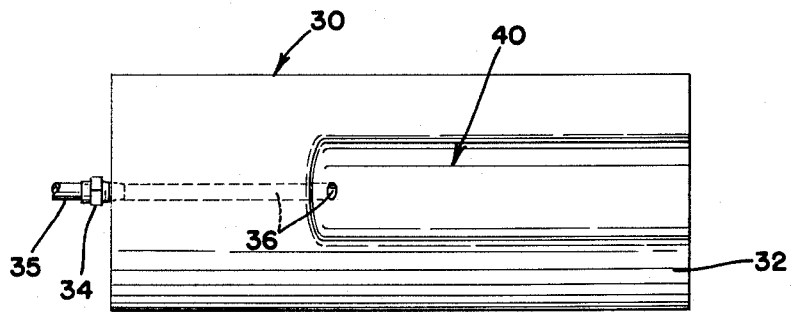
FIG. 2 is a top plan view illustrating a preferred embodiment of the present invention.

Referring now to the drawing, wherein the showings are for the purpose of illustrating a preferred embodiment of the invention only and not for the purpose of limiting same. FIGURE 1 shows a portion of a welding mill for welding a C-shaped skelp A into a pipe B. The skelp is of conventional construction and has two edges 10, one of which is removed to illustrate the interior of the skelp; which edges converge at a point 12 to form the generally cylindrical pipe B. To force the edges of the skelp A into convergence at point 12, the mill is provided with contour pressure rolls 14, 16 fragmentarily shown in FIGURE 3. Above the converging edges of the skelp is a conventionally constructed conductor 20 of the type having arms 21, 22 extending generally along the converging edges of the skelp A and terminating in a return bend 23 approximately positioned above the point of convergence 12. The construction of the inductor 20 and its relationship with the skelp A or pipe B forms no part of the invention and is illustrated only to better illustrate the environment to which the present invention is directed. By providing a high frequency current flow in inductor 20, the converging edges 10 are subjected to an induced voltage which causes an induced current flow along the edges and generally across point 12. The current flowing along the converging edges 10 and across the point of convergence 12 raises the temperature of the edges so that they may be fused as they are forced together by the pressure rolls 14, 16. The point at which the welding actually takes place does not necessarily coincide with the point of convergence 12; to the contrary, the welding point is offset slightly from the point at which the edges initially converge. For the purposes of illustrating the preferred embodiment of the present invention, it may be assumed, without distracting from the disclosure, that the point of convergence is also the point at which the welding occurs. As the edges 10 are welded together seam 24 is formed from the plastic metal of the newly fused edges. This seam extends both above and below the surface of the pipe B as is illustrated in the FIGURE 3.

To control the pattern of current flow caused by the voltage induced into the skelp A, it has become common practice to position a current pattern controlling member, such as an impeder 30, directly below the inductor 20 and spaced slightly outward from the edges 10. The particular construction, and function of the impeder 30 is well known in the art of induction heating and it will not be described. It is to be appreciated that the relative dimension of the impeder 30 with respect to the inductor 20 and the pipe B are not necessarily those which would be used in practice; to the contrary, the dimensions and relationship in size of the various elements in the drawings are exaggerated to better illustrate the present invention. The impeder 30 may be constructed of various high magnetic permeability material such as sintered iron particles or iron lamina, without departing from the intended spirit and scope of the invention. Also, it is within the contemplation of the invention to provide an outer coating of refractory material onto certain portions of the impeder to protect the impeder from contact with other portions of the welding mill.

As so far explained, the welding mill for welding the C-shaped skelp A into the cylindrical pipe B does not differ substantially from known welding mills. As the converging edges 10 are welded together, a certain amount of molten metal splatters from the welding point and these metal particles, designated as C in FIGURE 1, tend to drop downwardly within the interior of the pipe B. In the past, these particles of molten metal would accumulate on the impeder 30. As the welding operation continued, the amount of particles C accumulated on the impeder 30 was increased until the particles would actually erode through any protective coating on the impeder and form a bridge between the ferrous material of the impeder and the electrical conductive material of the pipe B. This would ground the pipe and the welding current would flow through the bridge formed from particles C into the impeder. The present invention contemplates a means for preventing the accumulation of these metal particles C between the skelp A and the impeder 30.

Figure 3:
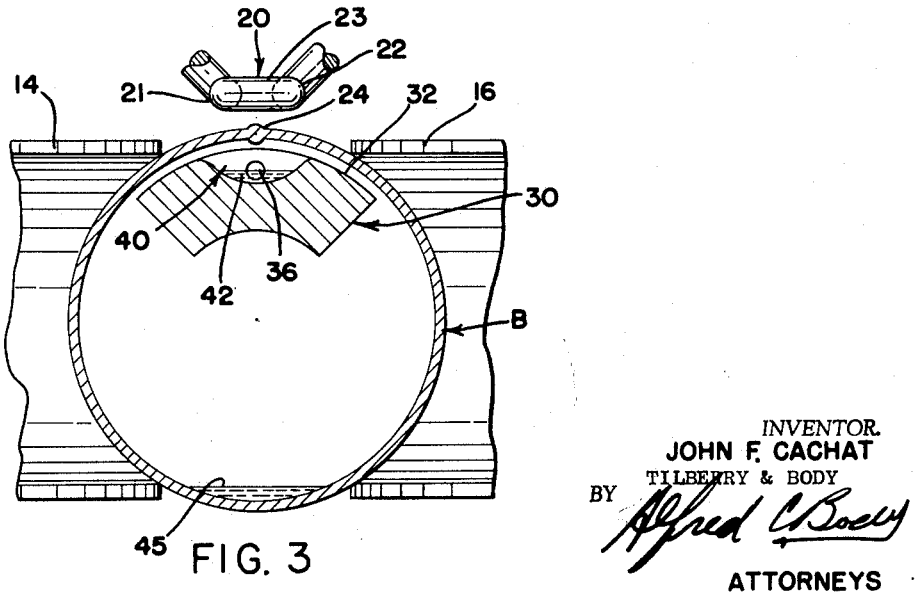
FIG. 3 is a cross sectional view taken generally along line 3—3 of FIG. 1.

In accordance with the present invention, means are provided for flushing the particles C from the surface of the impeder as they drop from the welding point 12. The means for flushing the particles C may take a variety of structural forms; however, in accordance with the preferred embodiment of the present invention, the flushing device takes the structural form of a slight modification in the commonly used construction of the impeder 30. Like known impeders, the impeder 30 has an upper contoured surface 32 spaced only slightly from the inner surfaces of the skelp A and pipe B, and is provided with the usual cooling fluid connection 34 joining a cooling fluid supply line 35 to an internal cooling fluid passage 36. The impeder 30, however, is modified by providing a trough 40 at the upper surface 32 and positioned below the welding point 12. The width of the trough is such to catch the molten metal particles C as they splatter from the welding point 12. The cooling fluid passage 36 terminates at the trough 40 so the cooling fluid 42 flows from the passage 36 into the trough and along the trough until it cascades from the impeder at 44. Thereafter, the cooling fluid accumulates in the lower portion of the pipe B to the level 45 as shown in FIGURE 3.

In operation, as the welding of the edges 10 continues, the molten metal particles C splatter downwardly from the welding point 12 and into the trough 40 where they are immediately quenched by the fluid 42 and washed away over the cascade 44. There is no tendency of the particles C to fuse together and form a bridge between the impeder and the pipe B. Accordingly, the molten metal particles C are continuously being flushed away from the impeder.

Although the cooling fluid has been illustrated as a liquid such as water, it is possible to provide a stream of gas, such as air, between the impeder and the inner wall of pipe B to blow away the particles before they accumulate onto the upper surface of the impeder 30. Although other such modifications in the invention are possible, in practice, the use of water flowing through the trough of the conventionally used water cooled impeder, has proven quite satisfactory. It should also be appreciated that the flow of liquid through the trough could be intermittent to periodically flush out the particles accumulating in the trough. Although this type of construction would be within the intended scope and spirit of the invention, the particles may tend to fuse onto the impeder.

The present invention has been discussed in connection with a preferred embodiment thereof; and, it must be appreciated that the invention is not to be limited to the preferred embodiment subscribed. To the contrary, various modifications may be made in the preferred embodiment without departing from the intended scope and spirit of the present invention as defined in the appended claims.

Having thus described my invention, I claim:

1. A device for preventing the accumulation of metal particles between a C-shaped skelp being welded into a pipe at a welding point adjacent the point of convergence of the skelp edges and a current pattern controlling member having an internal cooling passage and being located within said pipe directly below said welding point, said device comprising: an open trough in said current pattern controlling member and located directly below said welding point and facing upwardly toward said welding point, said trough having an inlet and an outlet, said inlet connected to said internal passage, and said outlet communicating with the interior of said pipe.

2. In an impeder for controlling the current pattern within the converging edges and across the welding point of a pipe being welded by high frequency induced currents, said impeder being below said edges and said welding point and extending inwardly of said pipe beyond said welding point, said impeder comprising a ferromagnetic body with a refractory coating and having an upwardly extending, arcuately shaped surface spaced only slightly from said edges and said welding point of said pipe, an internal coolant passage in said body and a coolant supply line connected to said body for communicating said passage with a coolant supply, the improvement comprising: a trough in said impeder body and facing said welding point for receiving metal splattering from said welding point, an orifice for directing coolant from said internal coolant passage of said impeder body into said trough on said body, and said trough having an opening at the end of said body opposite said orifice to allow flushing of said coolant from said trough into said welded pipe.

References Cited by the Examiner

UNITED STATES PATENTS 3,028,469  4/62  Bognar _____ 219—8.5

RICHARD M. WOOD, *Primary Examiner.*